US009056408B2

(12) United States Patent
Sawayanagi

(10) Patent No.: US 9,056,408 B2
(45) Date of Patent: Jun. 16, 2015

(54) INJECTION MOLDING MACHINE

(75) Inventor: Masahiro Sawayanagi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/988,816

(22) PCT Filed: Jan. 20, 2012

(86) PCT No.: PCT/JP2012/051730
§ 371 (c)(1), (2), (4) Date: May 22, 2013

(87) PCT Pub. No.: WO2012/099276
PCT Pub. Date: Jul. 26, 2012

(65) Prior Publication Data

US 2013/0295222 A1 Nov. 7, 2013

(30) Foreign Application Priority Data

Jan. 21, 2011 (JP) ................................. 2011-010932

(51) Int. Cl.
*B29C 45/26* (2006.01)
*B29C 45/04* (2006.01)
(Continued)

(52) U.S. Cl.
CPC ........... *B29C 45/0416* (2013.01); *B29C 45/372* (2013.01); *B29C 45/263* (2013.01); *B29C 45/0025* (2013.01); *B29C 45/2628* (2013.01);
(Continued)

(58) Field of Classification Search
CPC ............ B29C 45/0025; B29C 45/0416; B29C 45/2628; B29C 45/263; B29C 45/372; B29D 11/00798; B29D 11/00807; F21V 5/04; F21V 21/088; F21V 7/02
See application file for complete search history.

(56) References Cited

U.S. PATENT DOCUMENTS 3,830,682 A * 8/1974 Rowland ....................... 428/142
5,440,658 A 8/1995 Savage, Jr.

(Continued)

FOREIGN PATENT DOCUMENTS

CN 1380510 A 11/2002
CN 1579737 A 2/2005

(Continued)

OTHER PUBLICATIONS

International Search Report and Written Opinion of the International Search Report for PCT/JP2012/051730 dated May 22, 2012.

(Continued)

*Primary Examiner* — James Mackey
(74) *Attorney, Agent, or Firm* — Kenealy Vaidya LLP

(57) ABSTRACT

An injection molding machine 1 that molds an LED illumination housing includes a fixing mold 2 that is formed in a U-shaped cross section, a moving mold 3 that is fitted to the fixing mold 2, a driving mechanism 6 that brings the moving mold 3 into contact with the fixing mold 2 and separates the moving mold 3 from the fixing mold 2, and a material supply mechanism 10 that injects resin of a molten state into a cavity 12 configured when the fixing mold 2 and the moving mold 3 are fitted to each other. Furthermore, a plurality of concave and convex portions 21 is provided on a bottom surface 20 of the fixing mold 2 so as to diffuse light transmitted through the LED illumination housing by forming a lens cut portion of a polyhedron shape on an outer surface of the LED illumination housing.

9 Claims, 9 Drawing Sheets

X 5 6 4 3 11 2 30 12 21 30a 20 7 10 1 8 9

(51) Int. Cl.

| | |
|---|---|
| ***B29C 45/37*** | (2006.01) |
| ***B29C 45/00*** | (2006.01) |
| ***B29D 11/00*** | (2006.01) |
| ***F21V 5/04*** | (2006.01) |
| ***F21V 21/088*** | (2006.01) |
| ***G02B 7/02*** | (2006.01) |

(52) U.S. Cl.

CPC .... *B29D 11/00798* (2013.01); *B29D 11/00807* (2013.01); *F21V 5/04* (2013.01); *F21V 21/088* (2013.01); *G02B 7/02* (2013.01)

(56) References Cited

U.S. PATENT DOCUMENTS

| | | | | |
|---|---|---|---|---|
| 6,264,376 | B1 | 7/2001 | Savage, Jr. | |
| 7,628,605 | B2 * | 12/2009 | Mai et al. | 425/577 |
| 2002/0024158 | A1 * | 2/2002 | Nishigaki | 264/1.1 |
| 2002/0145882 | A1 | 10/2002 | Shimakura | |
| 2005/0023433 | A1 | 2/2005 | Ishitaka et al. | |
| 2007/0196533 | A1 | 8/2007 | Chen et al. | |
| 2008/0061478 | A1 | 3/2008 | Tanaka et al. | |
| 2009/0020915 | A1 | 1/2009 | Mai et al. | |
| 2009/0022844 | A1 | 1/2009 | Mai et al. | |

FOREIGN PATENT DOCUMENTS

| | | | |
|---|---|---|---|
| CN | 101842209 | A | 9/2010 |
| DE | 10 2007 042 755 | A1 | 3/2008 |
| EP | 1 793 245 | A2 | 6/2007 |
| GB | 2 925 596 | A | 1/1980 |
| JP | 9-109211 | A | 4/1997 |
| JP | 11-52139 | A | 2/1999 |
| JP | 11-53922 | A | 2/1999 |
| JP | 2000-4050 | A | 1/2000 |
| JP | 2005-153276 | A | 6/2005 |
| JP | 3125295 | U | 9/2006 |
| JP | 2007-245733 | A | 9/2007 |
| JP | 2008-166072 | A | 7/2008 |
| WO | 99/50915 | A1 | 10/1999 |

OTHER PUBLICATIONS

Office Action from German Patent App. No. 11 2012 000 5201 (May 20, 2014) with English language translation thereof.

Office Action from Korean Patent App. No. 10-2013-7015939 (May 27, 2014) with English language translation thereof.

Notice of Decision of Rejection from Korean Patent App. No. 10-2013-7015939 (Nov. 10, 2014) with English language translation thereof.

Chinese Office Action for the related Chinese Patent Application No. 201280004257.3 dated Sep. 24, 2014.

Japanese Office Action for the related Japanese Patent Application No. 2011-010932 dated Sep. 24, 2014.

* cited by examiner

X
5
6
4
3
11
1
2
30
12
21
30a
20
7
10
8
9

X
5
6
4
3
11
2
30
12
21
30a
20
7

14
15c
15
15b
A
18
A
15c
17
16
19
15a 5
6
X
4
3
215
202
30
30a
220
7

INJECTION MOLDING MACHINE

TECHNICAL FIELD

The present invention relates to an injection molding machine that molds an LED illumination housing.

BACKGROUND ART

In the related art, an LED illumination unit 214 as shown in FIG. 9 was used (see PTL 1) a lamp, an indicator for a motor vehicle or the like. The LED illumination unit 214 is constituted by an LED 16, a substrate 17 with the LED 16 mounted thereon, an LED illumination housing 215 (hereinafter, referred to as a housing) that accommodates the LED 16 and the substrate 17 or the like. Furthermore, reference numeral 18 of FIG. 9 is an electric wire that is connected to the substrate 17.

The housing 215 is molded by an injection molding machine 201 shown in FIGS. 6 to 8, and is formed of a transparent thermoplastic resin. As shown in FIG. 9, the housing 215 includes a bottom wall 215*a* having a flat surface, a peripheral wall 215*b* that is erected from a periphery of the bottom wall 215*a* in a cylindrical shape, and a flange portion 215*c* that is provided in an end portion of the peripheral wall 215*b*. Furthermore, the LED 16 emits light beyond the bottom wall 215*a*.

As shown in FIG. 6, the injection molding machine 201 includes a fixing mold 202, a moving mold 3 that is fitted to the fixing mold 202, a driving mechanism 6 that brings the moving mold 3 into contact with the fixing mold 202 and separates the moving mold 3 from the fixing mold 202, and a material supply mechanism 10 that injects resin of a molten state into a cavity 212 which is configured when the fixing mold 202 and the moving mold 3 are fitted to each other. Furthermore, reference numeral 11 in FIG. 6 indicates a mold mating surface between the fixing mold 202 and the moving mold 3, that is, a parting line.

The fixing mold 202 is formed in a U-shaped cross section that has a cavity formed in a concave shape from the parting line 11. An inner surface shape of the cavity of the fixing mold 202 is transferred onto resin, whereby the fixing mold 202 forms an external form of a housing 215. Furthermore, on a bottom surface 220 of the fixing mold 202, a gate hole communicating with a runner 7 of the material supply mechanism 10 is provided.

The moving mold 3 includes a core portion 30 that is formed in a convex shape from the parting line 11. The core portion 30 is situated in the cavity of the fixing mold 202 and forms a portion that is a hollow of the housing 215.

As shown in FIG. 6, the driving mechanism 6 is constituted by a support member 4 with the moving mold 3 attached thereto, a hydraulic cylinder device that is connected to the support member 4 or the like. The hydraulic cylinder device includes a rod 5 that is moved forward and backward along an arrow X direction in the state in which the support member 4 is attached to a tip thereof.

The material supply mechanism 10 is constituted by a heating cylinder 9 that heats and melts a pallet-like resin, an injection nozzle 8 that injects resin molten in the heating cylinder 9, and a runner 7 that leads resin injected from the injection nozzle 8 into each cavity 212 of a plurality of molds or the like.

In the injection molding machine 201 mentioned above, the housing 215 is formed as described below. Firstly, as shown in FIG. 7, in the state in which the fixing mold 202 and the moving mold 3 are fitted to each other and the mold is closed, resin of the molten state is injected into the cavity 212 by the material supply mechanism 10. Next, a predetermined time elapses in the state in which the fixing mold 202 and the moving mold 3 are fitted to each other, whereby resin in the cavity 212 is cooled by the mold and is gradually hardened. After that, as shown in FIG. 8, the moving mold 3 is separated from the fixing mold 202, the mold is opened, and the molded housing 215 is pulled out. In this manner, the housing 215 shown in FIG. 9 is molded.

CITATION LIST

Patent Literature

[PTL 1] JP-A-2008-166072

SUMMARY OF INVENTION

Technical Problem

In the injection molding machine 201 of the related art mentioned above, there is a problem when molding the housing 215. That is, there is a problem in that, since the housing 215 has a deep cylindrical shape, when the moving mold 3 as shown in FIG. 8 is separated from the fixing mold 202, a portion between a tip surface 30*a* and a bottom wall 215*a* in the core portion 30 enters a vacuum state, and the bottom wall 215*a* is pulled to the core portion 30, whereby the bottom wall 215*a* is deformed.

As a countermeasure to the problem, it is considered to lengthen a cooling hardening time of resin injected into the cavity 212 or delay a mold opening speed when the moving mold 3 is separated from the fixing mold 202, but in such a case, new problems such as an increase in working time and an increase in working cost are generated.

Furthermore, since a light source is an LED 16, when the LED illumination unit 214 mentioned above is used as an indicator for a motor vehicle, there is possibility in that a brightness irregularity is generated depending on positions viewed by a person. That is, there is possibility in that the LED illumination unit 214 is bright when viewed from a range indicated by B in FIG. 9, and the LED illumination unit 214 is dark when viewed from other positions.

The present invention has been implemented in view of the circumstances described above. An object of the present invention is to provide an injection molding machine that is able to mold an LED illumination housing capable of diffusing transmitted light to prevent a brightness irregularity, and is able to prevent the LED illumination housing from being deformed even in the case of opening the mold before the LED illumination housing is completely hardened.

Solution to Problem

In order to achieve the object, according to a first aspect of the present invention, there is provided an injection molding machine that molds an LED illumination housing which includes a fixing mold formed in a U-shaped cross section, a moving mold that is fitted to the fixing mold, a driving mechanism that brings the moving mold into contact with the fixing mold and separates the moving mold from the fixing mold, and a material supply mechanism that injects resin of a molten state into the cavity configured when the fixing mold and the moving mold are fitted to each other, wherein a plurality of concave and convex portions is provided on the bottom surface of the fixing mold so as to diffuse light transmitted through the LED illumination housing.

According to the invention described in a second aspect, in the invention described in the first aspect, the plurality of concave and convex portions may be provided on the bottom surface of the fixing mold so that a lens cut portion of a polyhedron shape is formed on an outer surface of the LED illumination housing.

According to the invention described in a third aspect, in the invention described in the first aspect, the plurality of concave and convex portions may be provided on the bottom surface of the fixing mold so that crimps are formed on the outer surface of the LED illumination housing.

Advantageous Effects of Invention

According to the invention described in the first aspect, since the plurality of concave and convex portions is provided on the bottom surface of the fixing mold so as to diffuse light that is transmitted through the LED illumination housing, it is possible to form the concave and convex portions on the outer surface of the bottom wall in the LED illumination housing by the concave and convex shapes, and for that reason, it is possible to form the LED illumination housing that is able to diffuse light of the LED transmitted through the bottom wall by the concave and convex shapes and prevent the brightness irregularity. Furthermore, since the LED illumination housing is provided with the concave and convex shapes, the inner portion thereof is hard to be transparent, and an appearance thereof is satisfactory even when the LED is turned off. Furthermore, according to the present invention, when opening the mold before the LED illumination housing is completely hardened, the LED illumination housing is glued to the bottom surface of the fixing mold, that is, the concave and convex portions, by an anchor effect, whereby it is possible to prevent the bottom wall in the LED illumination housing from being drawn to the fixing mold and is deformed. As a result, it is possible to reduce the cooling hardening time of resin injected into the cavity and increase the mold opening speed when the moving mold is separated from the fixing mold, and it is possible to promote a reduction of molding working cost.

According to the invention described in the second aspect, since the plurality of concave and convex portions is provided on the bottom surface of the fixing mold so that the lens cut portion of the polyhedron shape is formed on the outer surface of the LED illumination housing, it is possible to form the LED illumination housing that is able to diffuse light of the LED transmitted through the bottom wall by the lens cut portion to prevent the brightness irregularity. Furthermore, since the LED illumination housing is provided with the lens cut portion, the inner portion thereof tends not to be transparent, and the appearance is satisfactory even when the LED is turned off.

According to the invention described in the third aspect, since the plurality of concave and convex portions is provided on the bottom surface of the fixing mold so that the crimps are formed on the outer surface of the LED illumination housing, it is possible to form the LED illumination housing that is able to diffuse light of the LED transmitted through the bottom surface by the crimps to prevent the brightness irregularity. Furthermore, since the LED illumination housing is provided with the crimps, the inner portion thereof tend not to be transparent, and the appearance thereof is satisfactory even when the LED is turned off.

DESCRIPTION OF EMBODIMENTS

First Embodiment

An injection molding machine according to a first embodiment of the present invention and an LED illumination housing formed by the injection molding machine will be described by the use of FIGS. 1 to 6.

Figure 4:
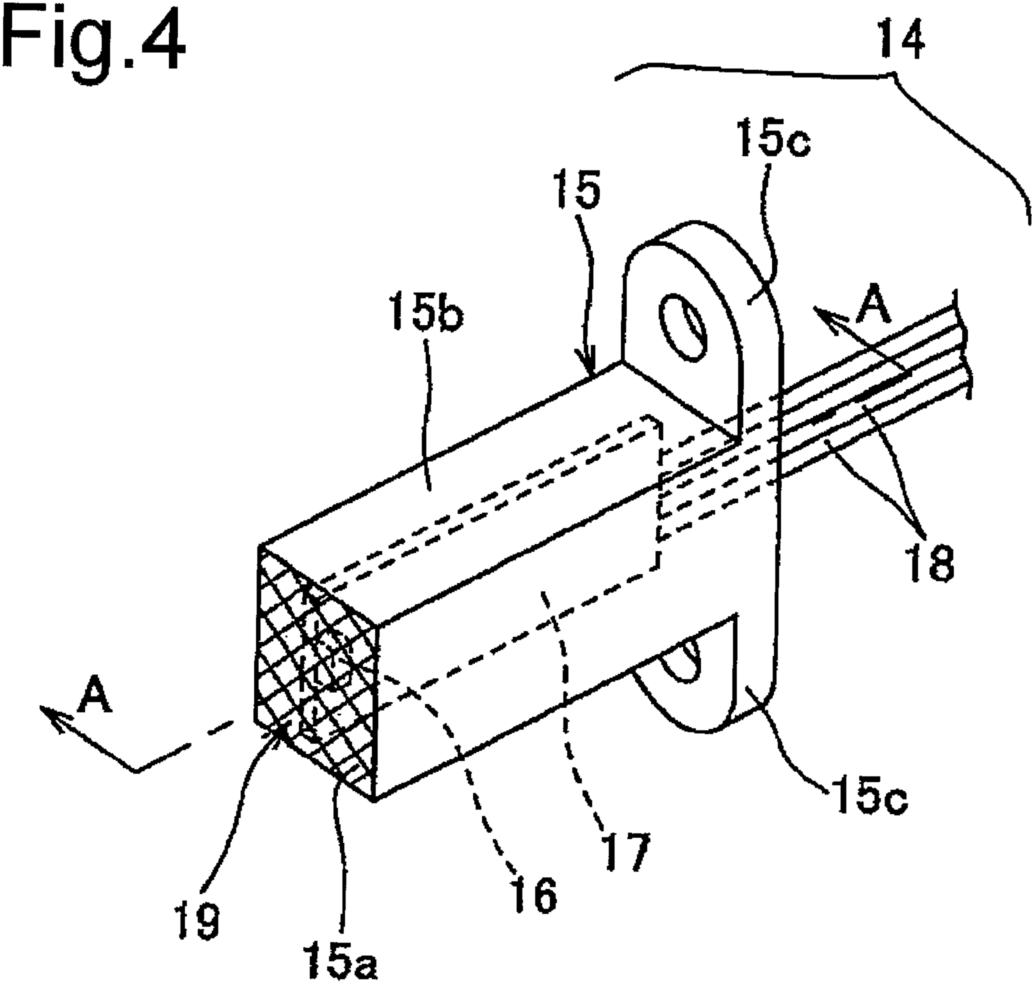
FIG. 4 is a perspective view of an LED illumination housing that is formed by the injection molding machine shown in FIG. 1.
Figure 5:
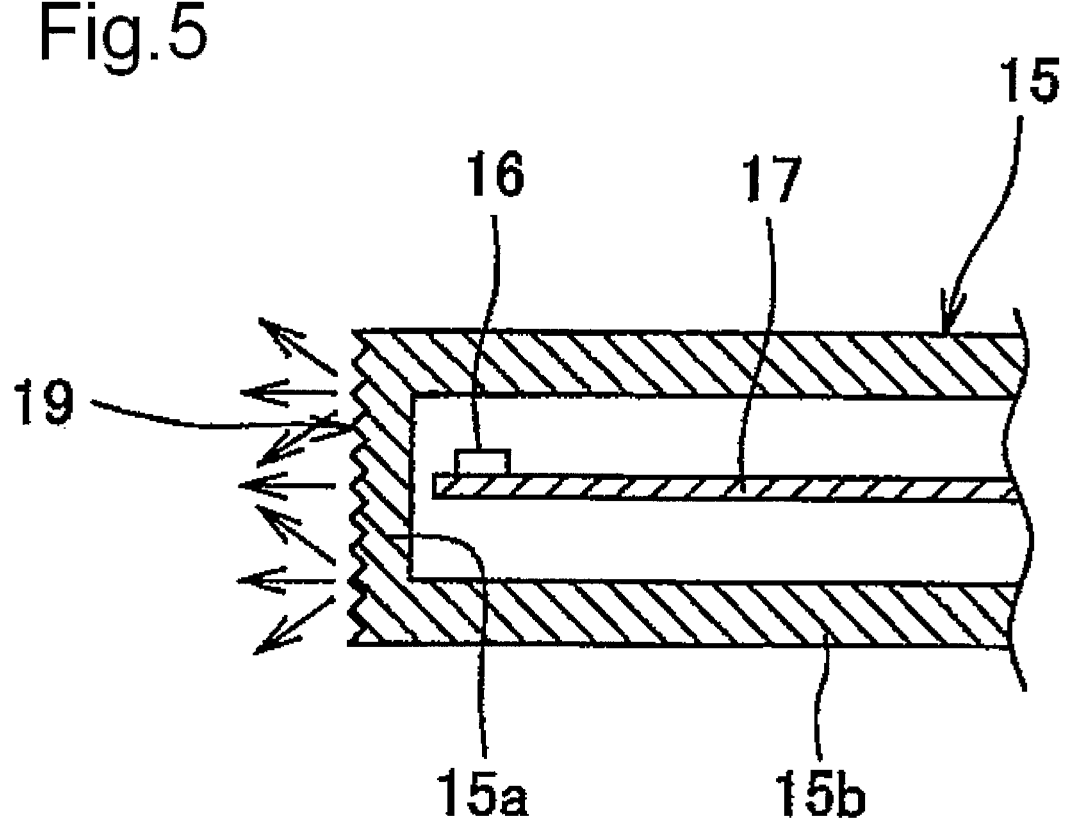
FIG. 5 is a cross-sectional view along line A-A in FIG. 4.
Figure 6:
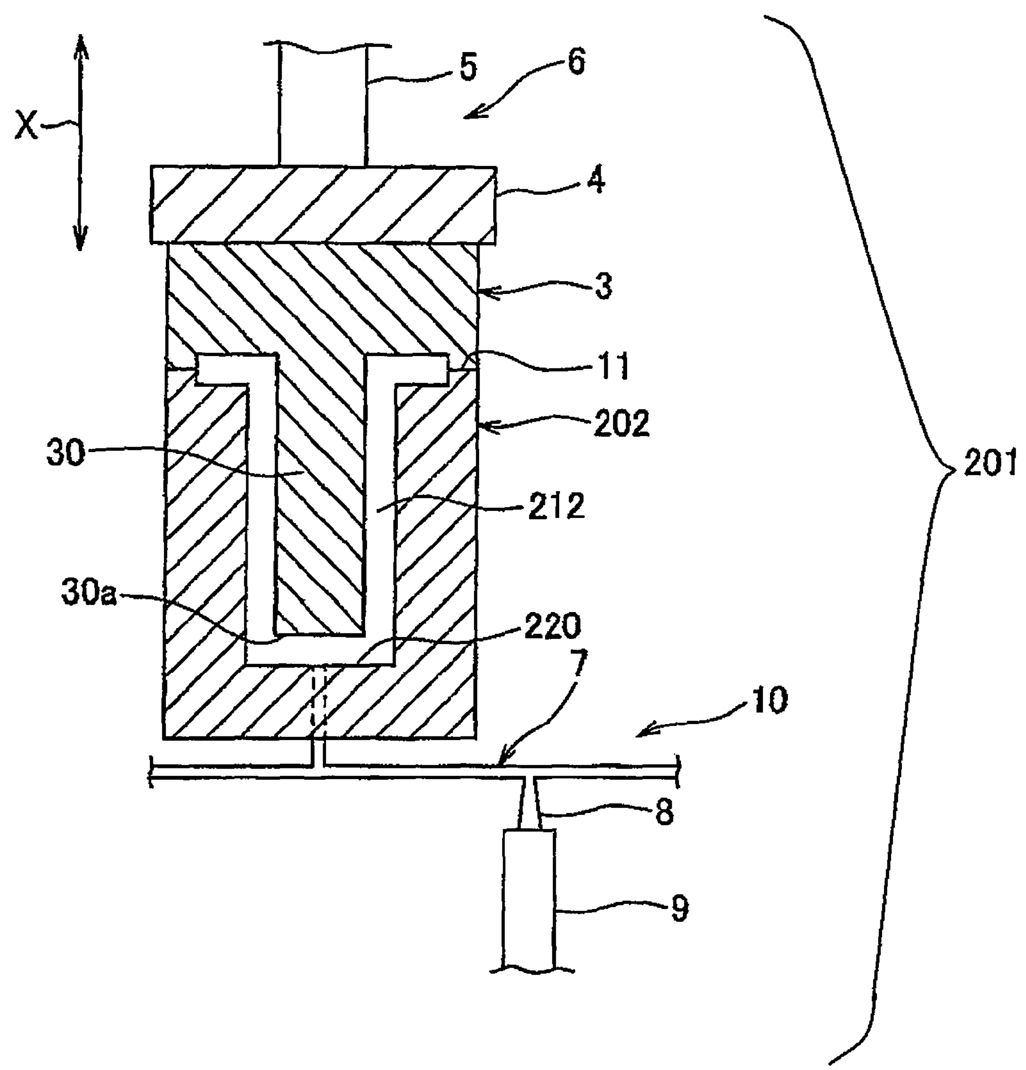
FIG. 6 is a schematic configuration diagram of an injection molding machine of the related art.
Figure 7:
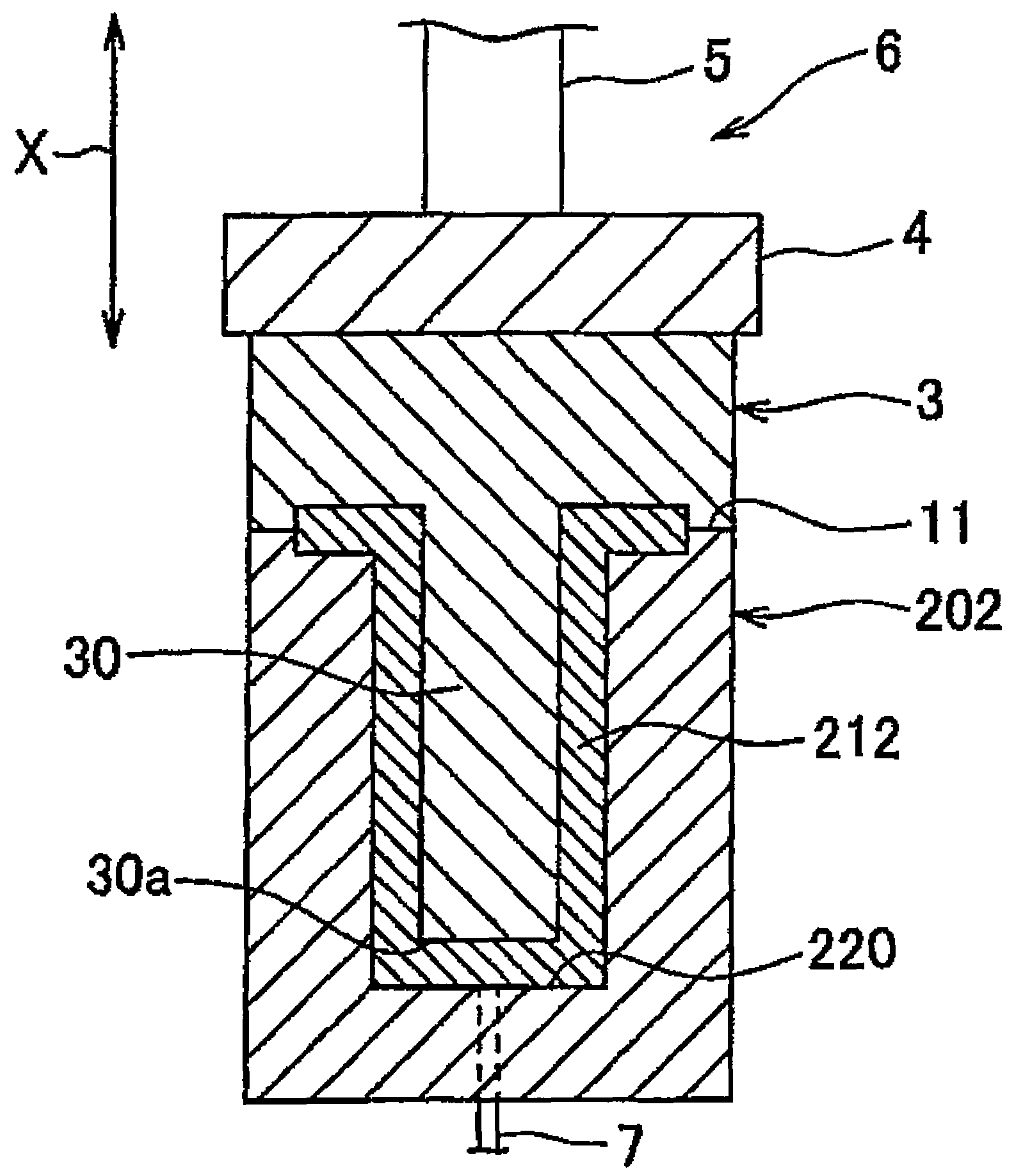
FIG. 7 is a cross-sectional view that shows a state in which resin of a molten state is injected into a cavity of the injection molding machine of the related art shown in FIG. 6.
Figure 8:
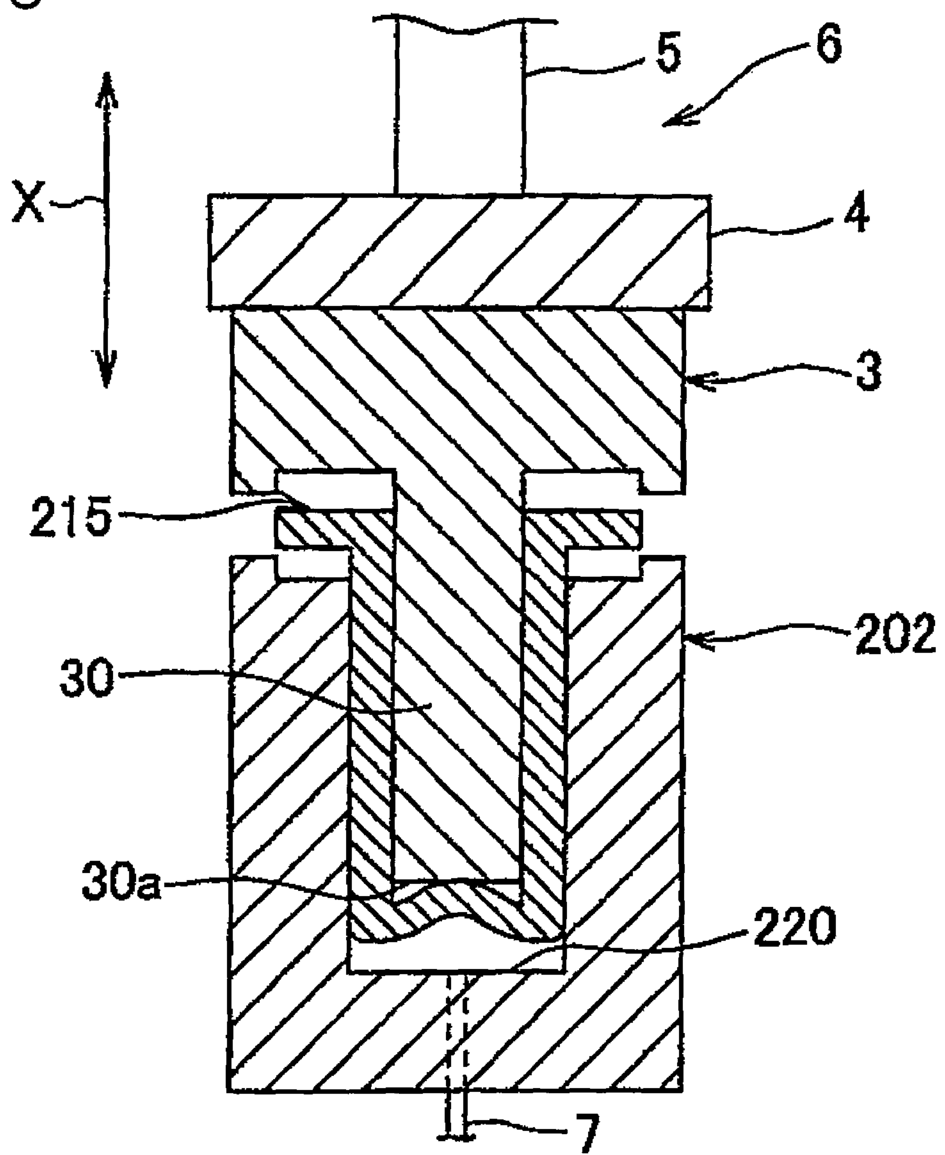
FIG. 8 is a cross-sectional view for describing a problem of the injection molding machine of the related art that shows a pattern in which the moving mold of the injection molding machine shown in FIG. 7 is separated from the fixing mold.
Figure 9:
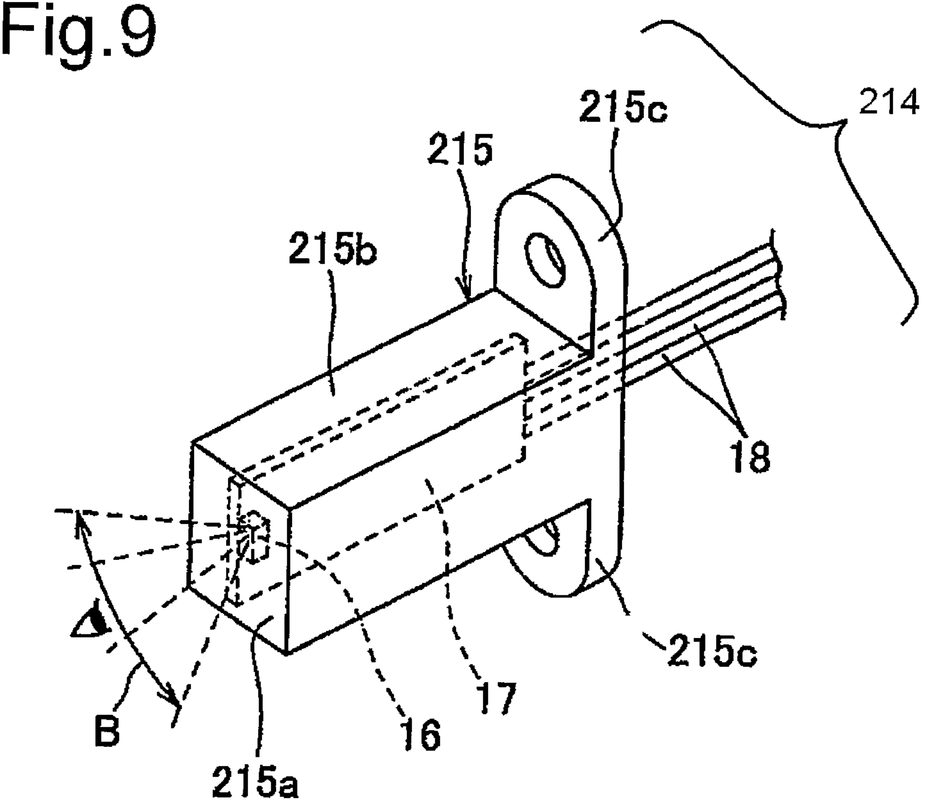
FIG. 9 is a perspective view of an LED illumination housing of the related art that is formed by the injection molding machine of the related art shown in FIG. 6.

An LED illumination housing 15 is a component that constitutes an LED illumination unit 14 used in an indicator for a motor vehicle, and is constituted by a transparent thermoplastic resin. Furthermore, as shown in FIGS. 4 and 5, the LED illumination unit 14 is constituted by the LED illumination housing 15, a substrate 17 that is accommodated in the LED illumination housing 15, an LED 16 that is mounted on the substrate 17 or the like. Furthermore, reference numeral 18 in FIG. 4 is an electric wire that is connected to the substrate 17.

The LED illumination housing 15 includes a bottom wall 15*a* formed with a lens cut portion 19 on an outer surface thereof, a peripheral wall 15*b* that is erected from a periphery of the bottom wall 15*a* in a cylindrical shape, and a flange portion 15*c* that is provided in an end portion of a side, which is separated from the bottom wall 15 in the peripheral wall 15*b*, in a flange shape. Furthermore, "the lens cut portion 19" is a part of a polyhedron shape in which a plurality of pyramid-shaped protrusion objects is regularly arranged on the same plane.

Light of the LED 16 transmitted through the bottom wall 15*a* is diffused by the lens cut portion 19 as shown in FIG. 5, whereby the brightness of the LED illumination unit 14 including the LED illumination housing 15 becomes uniform. Furthermore, since the LED illumination unit 14 is provided with the lens cut portion 19, the inner portion of the LED illumination housing 15 is hard to be transparent, and even when the LED 16 is turned off, the appearance thereof is satisfactory.

Figure 1:
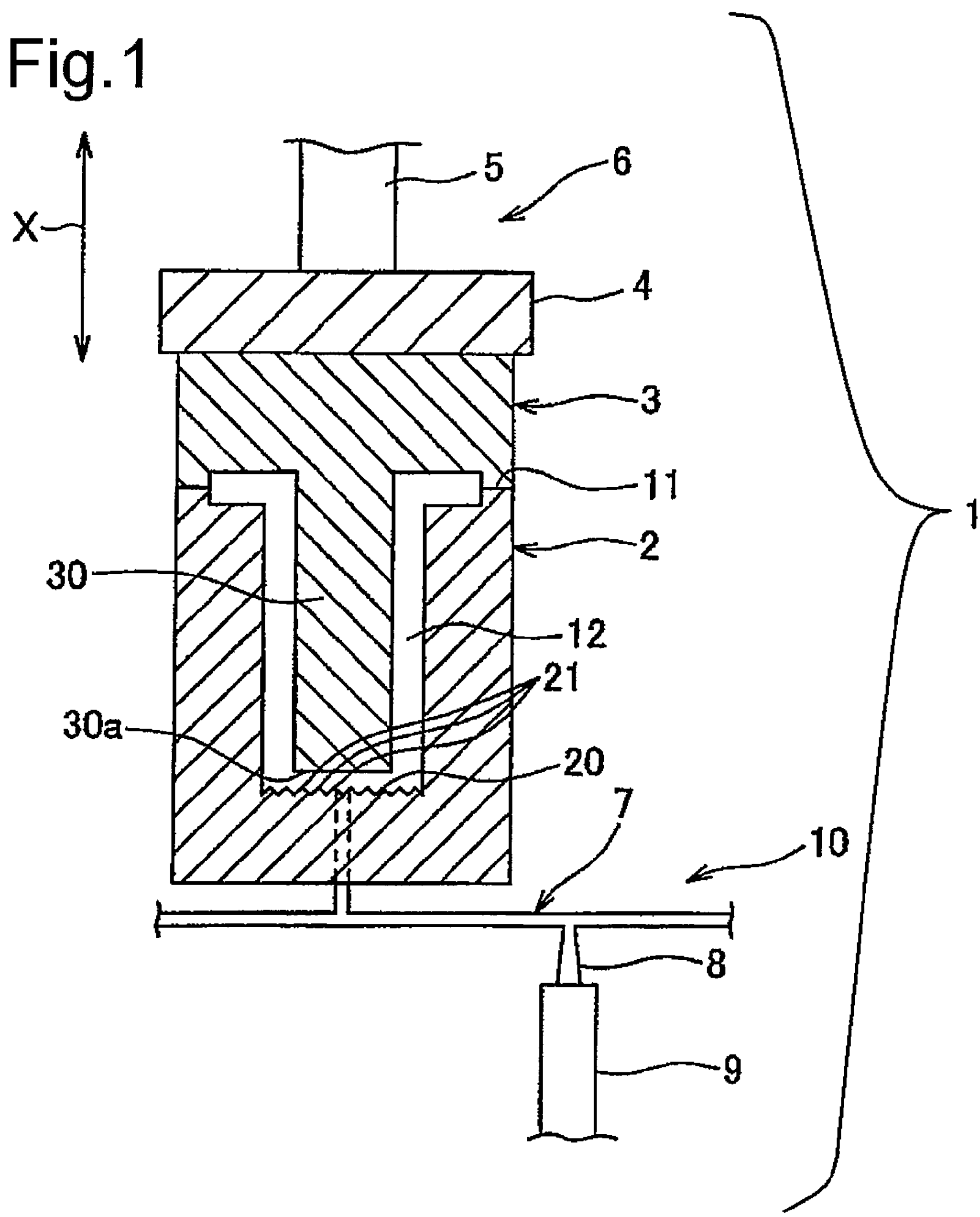
FIG. 1 is a schematic configuration diagram of an injection molding machine according to a first embodiment of the present invention.

Next, the injection molding machine 1 forming the LED illumination housing 15 mentioned above will be described. As shown in FIG. 1, the injection molding machine 1 includes the fixing mold 2, the moving mold 3 fitted to the fixing mold 2, the driving mechanism 6 which brings the moving mold 3 into contact with the fixing mold 2 and separates the moving mold 3 from the fixing mold 2, and the material supply mechanism 10 that injects resin of the molten state into the cavity 12 configured when the fixing mold 2 and the moving mold 3 are fitted to each other. Furthermore, reference numeral 11 of FIG. 1 indicates a mold mating surface between the fixing mold 2 and the moving mold 3, that is, the parting line.

The fixing mold 2 is formed in a U-shaped cross section that has a cavity formed from the parting line 11 in a concave shape. The inner surface shape of the cavity is transferred onto the fixing mold 2, whereby the fixing mold 2 forms an external shape of the LED illumination housing 15. Furthermore, on the bottom surface 20 of the fixing mold 2, a gate hole communicating with the runner 7 of the material supply mechanism 10 is provided.

Additionally, on the bottom surface 20 of the fixing mold 2 of the present invention, a plurality of concave and convex portions 21 is provided so that the lens cut portion 19 mentioned above is formed on the outer surface of the bottom wall 15*a* in the LED illumination housing 15. That is, on the bottom surface 20 of the fixing mold 2 of the present invention, the plurality of concave and convex portions 21 is provided so as to diffuse light that is transmitted through the LED illumination housing 15. The plurality of concave and convex portions 21 is formed in a shape in which the shape of the lens cut portion 19 is reversed.

The moving mold 3 includes a core portion 30 that is formed in a convex shape from the parting line 11. The core portion 30 forms a portion that becomes a hollow of the LED illumination housing 15 situated in the cavity of the fixing mold 2.

As shown in FIG. 1, the driving mechanism 6 includes a support member 4 to which the moving mold 3 is attached, a hydraulic cylinder device connected to the support member 4 or the like. The hydraulic cylinder device includes the rod 5 that is moved forward and backward along an arrow X direction in the state in which the support member 4 is attached to the tip thereof. Furthermore, the "driving mechanism" of the present invention may have a configuration that uses a driving source such as a motor in addition to the hydraulic cylinder device.

The material supply mechanism 10 is constituted by the heating cylinder 9 that heats and melts the pellet-like resin, the injection nozzle 8 that injects resin molten in the heating cylinder 9, the runner 7 that guides resin injected from the injection nozzle 8 to the respective cavities 212 of the plurality of molds or the like.

In the injection molding machine 1 mentioned above, the LED illumination housing 215 is molded as below.

Figure 2:
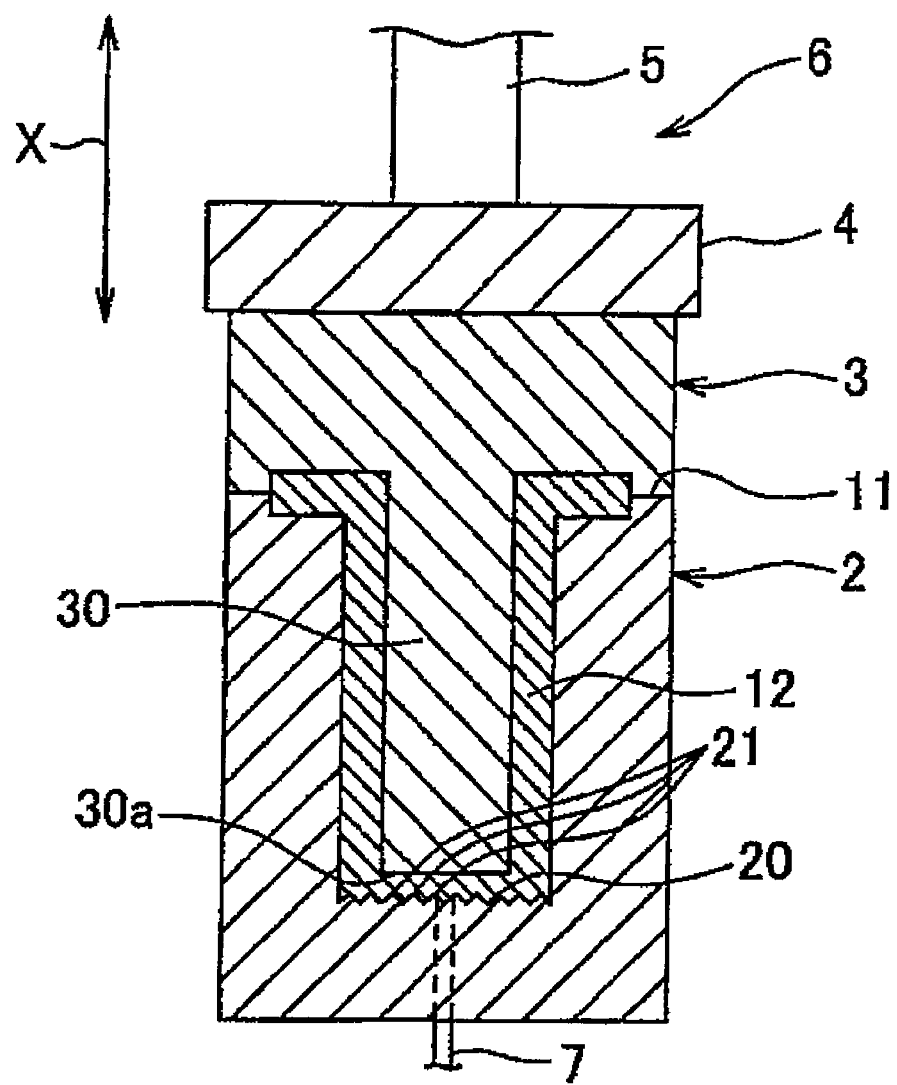
FIG. 2 is a cross-sectional view that shows a state in which resin of a molten state is injected into a cavity of the injection molding machine shown in FIG. 1.

Firstly, as shown in FIG. 2, in the state in which the fixing mold 2 and the moving mold 3 are fitted to each other and the mold is closed, resin of the molten state is injected into the cavity 12 by the material supply mechanism 10. Next, a predetermined time elapses in the state in which the fixing mold 2 and the moving mold 3 are fitted to each other, whereby resin in the cavity 12 is cooled by the mold and is gradually hardened.

Figure 3:
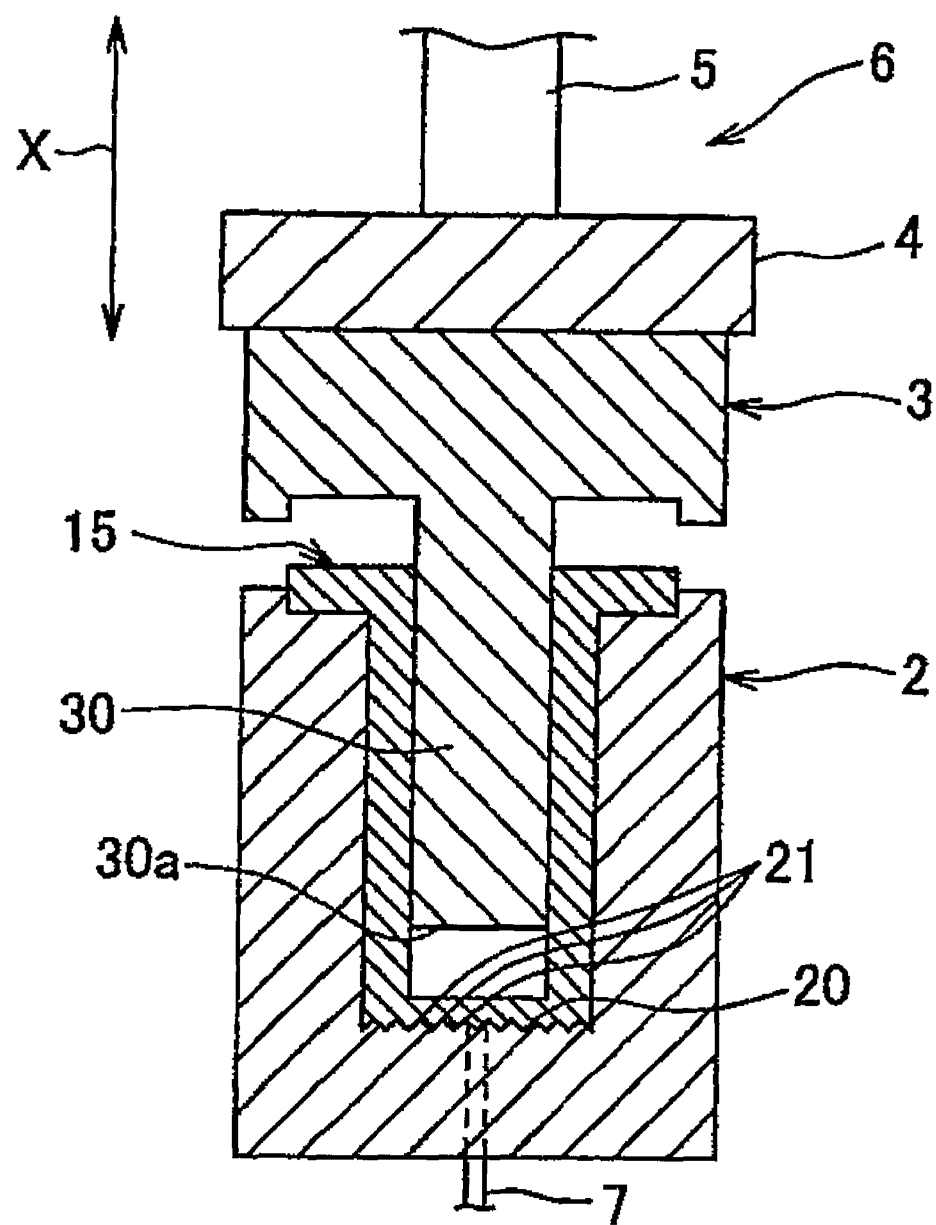
FIG. 3 is a cross-sectional view that shows a pattern in which a moving mold of the injection molding machine shown in FIG. 2 is separated from the fixing mold.

Moreover, before resin in the cavity 12, that is, the LED illumination housing 15 is completely hardened, as shown in FIG. 3, the moving mold 3 is separated from the fixing mold 2 and the mold is opened. At this time, in the injection molding machine of the related art, there is a problem in that the portion between the tip surface 30*a* in the core portion 30 and the bottom wall 15*a* in the LED illumination housing 15 comes to be in the vacuum state, the bottom wall 15*a* is drawn to the core portion 30, and the bottom wall 15*a* is deformed. However, in the injection molding machine 1 of the present invention, since the plurality of concave and convex portions 21 is provided on the bottom surface 20 of the fixing mold 2, the bottom wall 15*a* of the LED illumination housing 15 is prevented from being glued to the bottom surface 20 of the fixing mold 2, that is, the concave and convex portions 21, by the anchor effect, and the bottom wall 15*a* is drawn to the core portion 30 and is deformed.

Moreover, after the moving mold 3 is separated from the fixing mold 2 and the mold is opened as mentioned above, the LED illumination housing 15 molded from the fixing mold 2 is pulled out. In this manner, as shown in FIGS. 4 and 5, the LED illumination housing 15 is molded.

In this manner, in the injection molding machine 1 of the present invention, since the plurality of concave and convex portions 21 is provided on the bottom surface 20 of the fixing mold 2, it is possible to form the lens cut portion 19 on the outer surface of the bottom wall 15*a* in the LED illumination housing 15, and it is possible to reduce the cooling hardening time of resin injected into the cavity 12 and increase the mold opening speed when the moving mold 3 is separated from the fixing mold 2, whereby it is possible to promote a reduction in molding working cost.

Second Embodiment

An injection molding machine according to a second embodiment of the present invention and the LED illumination housing molded by the injection molding machine will be described.

The injection molding machine 1 of the first embodiment mentioned above has the configuration in which the plurality of concave and convex portions 21 is provided on the bottom surface 20 of the fixing mold 2 so that the lens cut portion 19 is formed on the outer surface of the bottom wall 15*a* in the LED illumination housing 15. However, in the injection molding machine of the present invention, a plurality of concave and convex portions is provided on the bottom surface of the fixing mold so that the plurality of crimps is formed on the outer surface of the bottom wall in the LED illumination housing. Furthermore, although it is not shown, the injection molding machine of the present embodiment has the same configuration as that of the injection molding machine 1 of the first embodiment other than the "concave and convex portions" of the fixing mold mentioned above.

The LED illumination housing to be molded by the injection molding machine of the present embodiment mentioned above is formed with a plurality of crimps instead of the lens cut portion 19 on the outer surface of the bottom wall. Although it is not shown, the LED illumination housing has the same configuration as that of the LED illumination housing 15 of the first embodiment other than the "crimps" mentioned above. In the same manner as the lens cut portion 19, the plurality of crimps diffuses light of the LED transmitted through the bottom wall of the LED illumination housing and uniformizes the brightness. Furthermore, it is difficult for the plurality of crimps to make the inner portion of the LED illumination housing transparent.

Furthermore, in the same manner as the fixing mold 2 provided with the concave and convex portions 21 forming the lens cut portion 19, when the moving mold is separated, the fixing mold provided with the concave and convex portions forming the crimps glues the bottom wall of the LED illumination housing, which is not completely hardened, to the bottom surface thereof by the anchor effect, and prevents the deformation of the bottom wall.

In addition, the embodiment mentioned above merely shows a typical embodiment of the present invention, and the present invention is not limited to the embodiment. That is, it is possible to variously modify and carry out the present invention within the scope not departing from the gist of the present invention.

This application is based upon and claims the benefit of priority of Japanese Patent Application No. 2011-010932 filed on Jan. 21, 2011, the contents of which are incorporated herein by reference.

INDUSTRIAL APPLICABILITY

According to the present invention, since the plurality of concave and convex portions is provided on the bottom surface of the fixing mold so as to diffuse light that is transmitted through the LED illumination housing, it is possible to form the concave and convex portions on the outer surface of the bottom wall in the LED illumination housing by the concave and convex shapes, and for that reason, it is possible to form the LED illumination housing that is able to diffuse light of the LED transmitted through the bottom wall by the concave and convex shapes and prevent the brightness irregularity. Furthermore, since the LED illumination housing is provided with the concave and convex shapes, the inner portion thereof is hard to be transparent, and an appearance thereof is satisfactory even when the LED is turned off. Furthermore, according to the present invention, when opening the mold before the LED illumination housing is completely hardened, the LED illumination housing is glued to the bottom surface of the fixing mold, that is, the concave and convex portions, by an anchor effect, whereby it is possible to prevent the bottom wall in the LED illumination housing from being drawn to the fixing mold and is deformed. As a result, it is possible to reduce the cooling hardening time of resin injected into the cavity and increase the mold opening speed when the moving mold is separated from the fixing mold, and it is possible to promote a reduction of molding working cost.

REFERENCE SIGN LIST

1 injection molding machine
2 fixing mold
3 moving mold
6 driving mechanism
10 material supply mechanism
12 cavity
15 LED illumination housing
19 lens cut portion
20 bottom surface
21 concave and convex portions

The invention claimed is:

1. An injection molding machine that molds an LED illumination housing, comprising:

- a fixing mold formed in a U-shaped cross section, and including a first mating surface and a cavity extending inwardly from the first mating surface;
- a moving mold that is fitted to the fixing mold, and including a second mating surface and a core portion extending from the second mating surface; and
- a driving mechanism that brings the moving mold into contact with the fixing mold and separates the moving mold from the fixing mold; and
- a material supply mechanism that injects resin of a molten state into a cavity configured when the fixing mold and the moving mold are fitted to each other,
- wherein, when the driving mechanism brings the moving mold into contact with the fixing mold, the core portion is inserted in the cavity so that the first mating surface comes into contact with the second mating surface,
- wherein the cavity has a bottom surface which faces a tip surface of the core portion with a gap when the core portion is inserted in the cavity, and
- wherein a plurality of concave and convex portions is provided on the bottom surface so as to form concave and convex portions on the LED illumination housing which diffuse light transmitted through the LED illumination housing.

2. The injection molding machine according to claim 1, wherein the plurality of concave and convex portions is provided on the bottom surface of the fixing mold so that a lens cut portion of a polyhedron shape is formed on an outer surface of the LED illumination housing.

3. The injection molding machine according to claim 1, wherein the plurality of concave and convex portions is provided on the bottom surface of the fixing mold so that crimps are formed on the outer surface of the LED illumination housing.

4. The injection molding machine according to claim 1, wherein the moving and fixing molds are configured to define a gap therebetween when the driving mechanism brings the moving mold into contact with the fixing mold.

5. The injection molding machine according to claim 4, wherein the driving mechanism moves the moving mold toward the fixing mold in a first direction, the gap defined between the moving and fixing molds includes a U-Shaped portion that includes two parallel longitudinal sections that extend in a direction parallel to the first direction.

6. The injection molding machine according to claim 5, wherein the gap defined between the moving and fixing molds includes two additional sections, each of the additional sections being contiguous with one of the longitudinal sections and being defined between the fixing and moving molds.

7. The injection molding machine according to claim 6, wherein each of the additional sections that is contiguous with one of the longitudinal sections extends away from the other longitudinal section.

8. The injection molding machine according to claim 7, wherein the two additional sections extend in a second direction that is perpendicular to the first direction.

9. The injection molding machine according to claim 8, wherein the bottom surface extends in a direction that is parallel to the second direction.

* * * * *